United States Patent
Gu et al.

(10) Patent No.: US 7,752,192 B2
(45) Date of Patent: Jul. 6, 2010

(54) METHOD AND SYSTEM FOR INDEXING AND SERIALIZING DATA

(75) Inventors: Xiaohui Gu, Chappaqua, NY (US); Lipyeow Lim, Hawthorne, NY (US); Haixun Wang, Irvington, NY (US); Min Wang, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/681,486

(22) Filed: Mar. 2, 2007

(65) Prior Publication Data

US 2008/0215520 A1    Sep. 4, 2008

(51) Int. Cl.
G06F 17/30 (2006.01)
(52) U.S. Cl. .................. 707/711; 707/673; 707/696; 707/741
(58) Field of Classification Search .................. 706/47, 706/48; 707/1–10, 100–102
See application file for complete search history.

(56) References Cited

U.S. PATENT DOCUMENTS

| | | | |
|---|---|---|---|
| 7,240,041 B2 * | 7/2007 | Martin et al. ................. | 706/48 |
| 7,418,434 B2 * | 8/2008 | Barry ......................... | 706/47 |
| 7,451,144 B1 * | 11/2008 | Koudas et al. ................. | 707/6 |
| 7,469,255 B2 * | 12/2008 | Kusterer et al. ............. | 707/102 |
| 2008/0086470 A1 * | 4/2008 | Graefe ........................... | 707/8 |

OTHER PUBLICATIONS

Wang et al., "ViST: A Dynamic Index Method for Querying XML Data by Tree Structures", SIGMOD 2003, Jun. 9-12, 2003, San Diego, California, 12 pages.
Rao, et al., "PRIX: Indexing and Querying XML Using Prufer Sequences", The 20th International Conference on Data Engineering, ICDE, Mar. 2004, Boston, Massachusetts, 12 pages.
Wang et al., "On the Sequencing of Tree Structures for XML Indexing", Tokyo, Japan, Apr. 2005, 11 pages.

* cited by examiner

*Primary Examiner*—Mohammad Ali
*Assistant Examiner*—Hauwen Peng
(74) *Attorney, Agent, or Firm*—Yee & Associates, P.C.; Kenneth R. Corsello

(57) ABSTRACT

The present invention provides a computer implemented method, an apparatus, and a computer usable program product for indexing data. A controller identifies a set of data to be indexed, wherein a set of data structure trees represents the set of data. The controller merges the set of data structure trees to form a unified tree, wherein the unified tree contains a node for each unit of data in the set of data. The controller assigns an identifier to the node for each unit of data in the set of data that describes the node within the unified tree. The controller then serializes the unified tree to form a set of sequential series that represents the set of data structure trees, wherein the set of sequential series forms an index for the set of data.

19 Claims, 8 Drawing Sheets

500

| Minimum Unified Tree Algorithm |
|---|

510 — Input: $T_D = \{T_1, T_2, \cdots, T_n\}$ - document trees.

520 — Output: Minimum Unified Tree;

530 — procedure Minimum Unified Tree ($T_D$) begin
    Append a virtual node $r_{ST}$ as root of ST; — 531
    for each tree $T_i \in T_D$ do — 532
        Let node $r_i$ be the root of $T_i$, — 533
        MergeAsChild($r_i$, $r_{ST}$); — 534
        Unmark all the nodes in ST; — 535
    Output ST as an approximate MST; — 536

537 — end

540 — procedure MergeAsChild(node u, node w) begin
    $\theta \leftarrow$ all the nodes with the same label as u under w; — 541
    if $|\theta| = 0$ then — 542
        Append node v as child of w: Label(v) = Label(u); — 543
    else — 544
        for *each unmarked node* $v' \in \theta$ do — 545
            $\gamma_{v'}$ = GetSimilarity(u,$v'$); — 546
        Let node v be the one with the maximal $\gamma_{v'}$; — 547
    Make a mapping from u to v; — 548
    Mark node v as mapped; — 549
    for *each child $c_u$ of u* do: MergeAsChild($c_u$, v); — 550

551 — end

Function GetSimilarity(node x, node y) begin — 560
        $\theta_x \leftarrow$ all descendants of node x; — 561
        $\theta_y \leftarrow$ all descendants of node y; — 562
        Return $1 + |\theta_x \cap \theta_y|$; — 563

564 — end

FIG. 5

METHOD AND SYSTEM FOR INDEXING AND SERIALIZING DATA

BACKGROUND OF THE INVENTION

1. Field of the Invention

The present invention relates generally to an improved data processing system, and specifically to an improved method and apparatus of organizing data. More specifically, the present invention relates to a computer implemented method, an apparatus, and a computer usable program product for indexing data.

2. Description of the Related Art

A tree is a common type of data structure used to represent an extensible Markup Language (XML) document. A tree is a data structure formed from a set of connected nodes that includes a root node, a set of internal nodes, and a set of leaf nodes. The root node is the top-most node, or the parent node from which all other nodes branch off. A child node descends downward from the root node, with the leaf node being the bottom-most node. The child nodes between the root node and the leaf nodes are considered internal nodes. A subtree typically branches from an internal node, and an internal node includes a set of leaf nodes.

Efficiently evaluating twig queries in XML documents are at the core of structured query processing. A twig is a branch extending or descending from the root node. A query is a method for extracting information from a data structure. Therefore, a twig query is the extraction of information from a tree data structure via one of the branches extending from the root node.

Typically, to evaluate twig queries, current approaches disassemble a query into multiple root-to-leaf simple paths. In other words, current approaches break down a tree so that each tree branch is serialized into a single path. With the assistance of some indexing structures, the simple path queries are each independently evaluated, and the results of each independent evaluation are subsequently joined together to form a final answer. However, the process of dissembling a query and joining the intermediate results into a final result is an expensive operation because the process utilizes a lot of memory and hardware resources during processing, which impacts the performance in processing other requests in a data processing system. Consequently, joining intermediate results into a final result is one of the most significant costs in evaluating twig queries.

One method for eliminating intermediate joining operations is to transform trees into a sequence-based query process. The sequence-based query process converts documents into a one-dimensional sequence with the sequence including enough information so that each sequence can be converted back to the original tree format. However, current sequence-based approaches are under-optimized in both index space and query time, because the tree structures are inherently incompatible with one-dimensional sequence structures. When trees are converted into one-dimensional sequences, the total order of the nodes from the original document is not translated into the final reconstructed tree. Therefore, redundancies in tree paths can exist in the final reconstructed tree, thereby increasing overall query times.

Furthermore, the priority of current sequence-based approaches is to ensure representation equivalence in sequencing and query equivalence in query processing. In other words, the sequence-based approach ensures that no ambiguity exists in the data representation, and that the original and only the original tree structure can be derived from the sequence. However, as indicated above, the reduction in ambiguity results in redundancies in tree paths, which in turn results in non-optimized index sizes, and which ultimately translates to larger indexes at increased cost for storing the index.

SUMMARY OF THE INVENTION

The present invention provides a computer implemented method, an apparatus, and a computer usable program product for indexing data. A controller identifies a set of data to be indexed, wherein a set of data structure trees represents the set of data. The controller merges the set of data structure trees to form a unified tree, wherein the unified tree contains a node for each unit of data in the set of data. The controller assigns an identifier to the node for each unit of data in the set of data that describes the node within the unified tree. The controller then serializes the unified tree to form a set of sequential series that represents the set of data structure trees, wherein the set of sequential series forms an index for the set of data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a minimum unified tree algorithm, in accordance with an illustrative embodiment;

DETAILED DESCRIPTION OF THE PREFERRED EMBODIMENT

Figure 1:
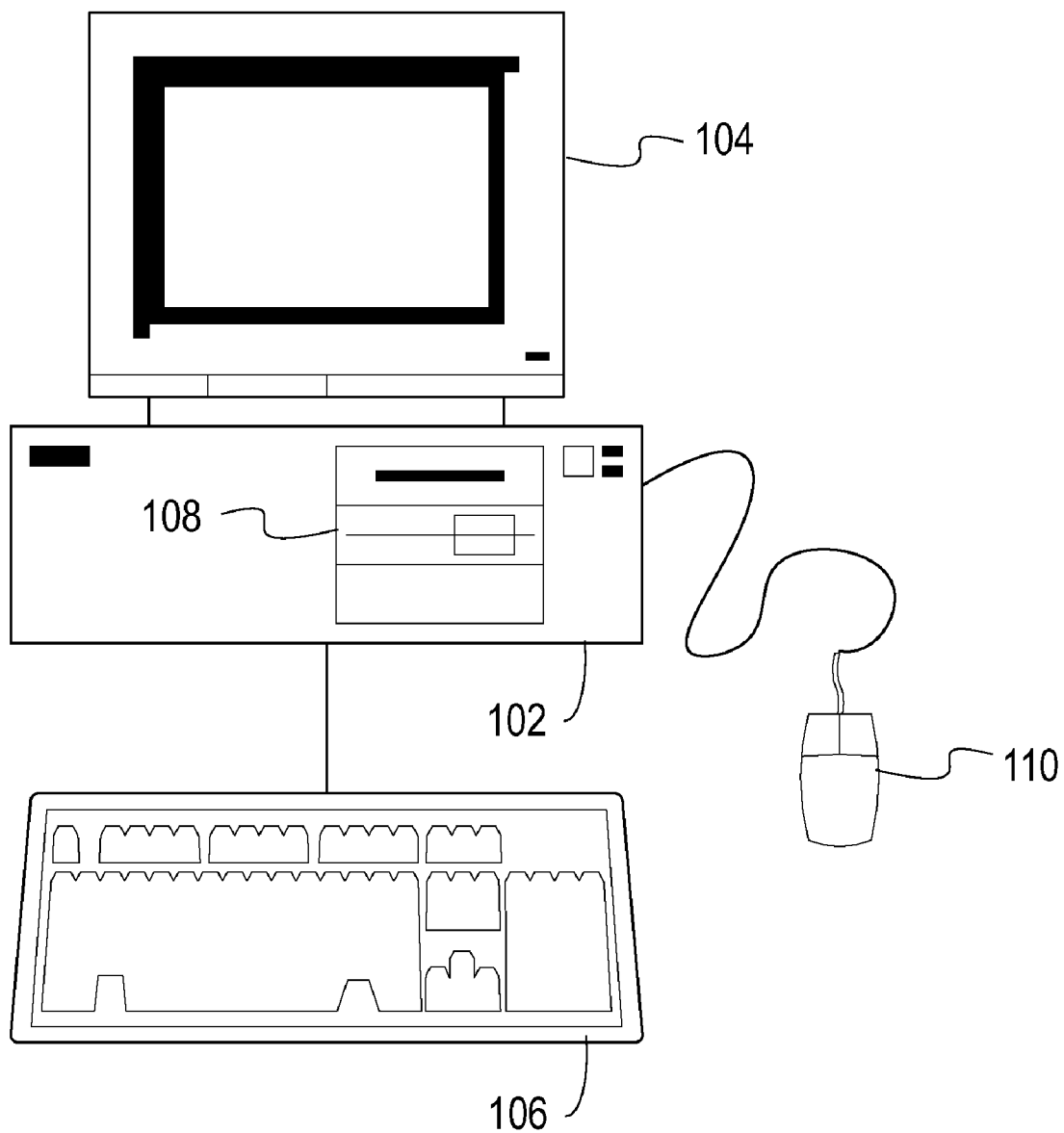
FIG. 1 is a pictorial representation of a data processing system, in which illustrative embodiments may be implemented.

With reference now to the figures and in particular with reference to FIG. 1, a pictorial representation of a data processing system is shown in which illustrative embodiments may be implemented. Personal computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Personal computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Personal computer 100 also preferably includes a graphical user interface (GUI) that may be implemented by means of systems software residing in computer readable media in operation within personal computer 100.

Figure 2:
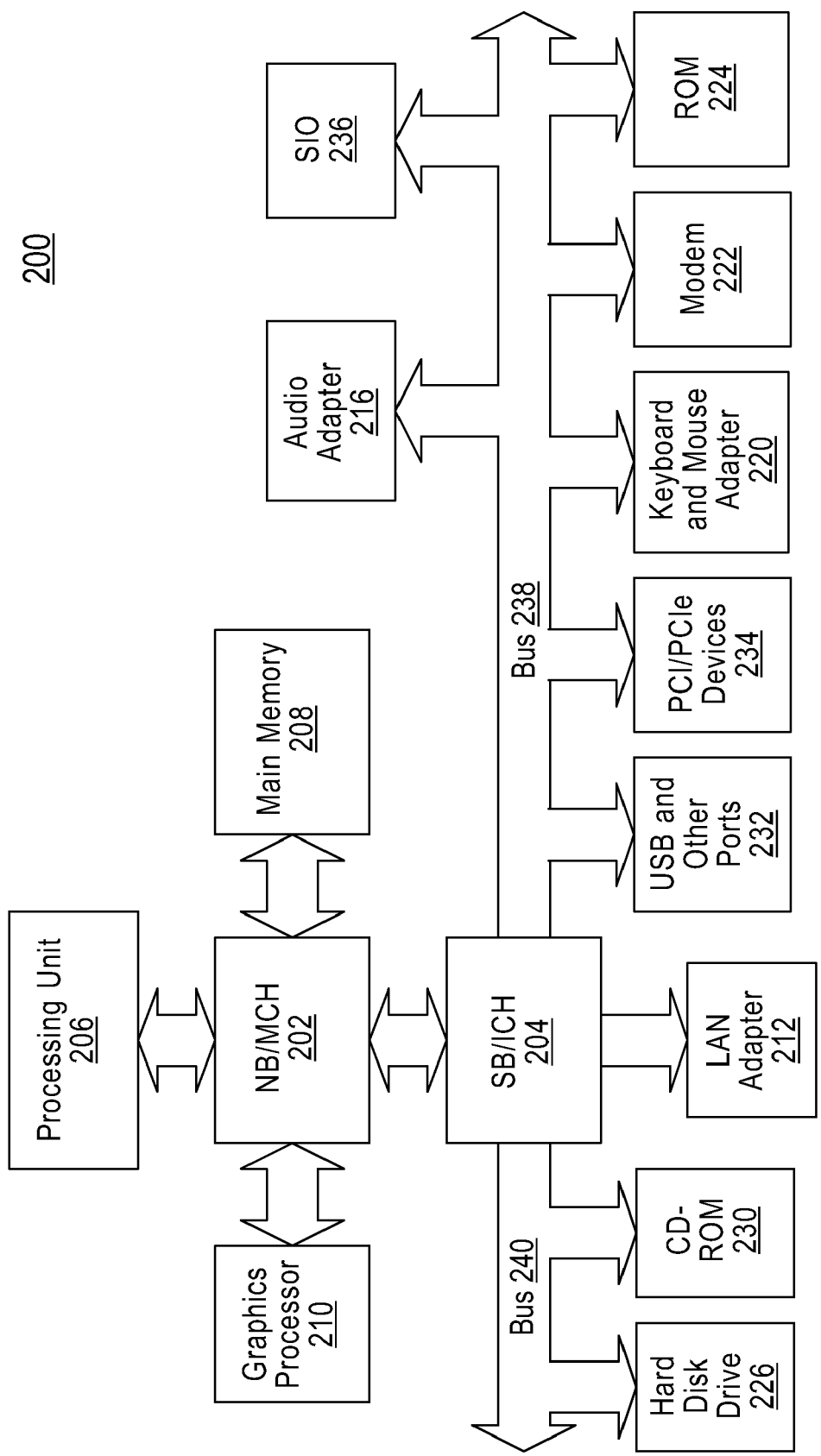
FIG. 2 depicts a block diagram of a data processing system, in which illustrative embodiments may be implemented.

Next, FIG. 2 depicts a block diagram of a data processing system in which illustrative embodiments may be implemented. Data processing system 200 is an example of a computer, such as personal computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub (SB/ICH) 204, audio adapter 216, keyboard and mouse adapter 220, modem 222, read only memory (ROM) 224, universal serial bus (USB) and other ports 232. PCI/PCIe devices 234 are coupled to south bridge and I/O controller hub (SB/ICH) 204 through bus 238. Hard disk drive (HDD) 226 and CD-ROM 230 are coupled to south bridge and I/O controller hub (SB/ICH) 204 through bus 240.

PCI/PCIe devices may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. This operating system coordinates and controls various components within data processing system 200. The operating system may be a commercially available operating system, such as Microsoft® Windows XP®. Microsoft® and Windows XP® are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory (ROM) 224, or in one or more peripheral devices.

The hardware shown in FIGS. 1 and 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIGS. 1 and 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, a laptop computer, or a telephone device.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub (NB/MCH) 202. Also, a processing unit may include one or more processors or CPUs.

The depicted examples in FIGS. 1 and 2 are not meant to imply architectural limitations. In addition, the illustrative embodiments provide for a computer implemented method, an apparatus, and a computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method, an apparatus, and a computer usable program product for indexing data. A controller identifies a set of data to be indexed. A set of data can be any set of information, including but not limited to a set of documents, instructions, or queries. A set of data structure trees represents the set of data.

The controller merges the set of data structure trees to form a unified tree. The unified tree contains a node for each unit of data in the set of data structure trees. Each unit of data in the set of data structure trees can represent any portion or section of the data, with each unit of data being the same or of a different size. To merge the set of data structure trees to form a unified tree, the controller first creates a virtual root node for each data structure tree in the set of data structure trees. A virtual root node is a root node that is identical for each data structure tree. The virtual root node may or may not include any information, but the purpose of the virtual root node is to establish a common node from which all the data structure trees can branch.

After identifying the virtual root node for each data structure tree, the controller merges the virtual root nodes for each data structure tree so that all data structure trees are included in a unified tree. After merging the virtual root nodes, the controller identifies a set of identical lineages. An identical lineage is a set of descendent nodes which are identical in type and order as another identical lineage. The controller merges the set of identical lineages.

The controller then assigns an identifier to each node that describes the node within the unified tree. In the illustrative embodiments, the identifier can be a 4-tuple label that includes a label element, a left element, a right element, and a depth position element. The left element is the traversal number when the controller enters the node, while the right element is the traversal number when the controller exits the node.

After assigning the identifier, the controller serializes the unified tree to form a set of sequential series that represents the set of data structure trees. The serialization of the unified tree flattens the unified tree so that each node is listed by the identifier. To serialize the unified tree, the controller then splits the unified tree into the original set of data structure trees. The controller flattens the set of data structure trees into a set of sequential series. The set of sequential series includes the identifier for each node in the corresponding data structure tree. The controller then lists the identifier for each node in the corresponding data structure tree. The set of sequential series forms an index for the set of data structure trees.

In an alternative embodiment, the unified tree is a minimum unified tree. A minimum unified tree is a unified tree with the fewest number of branches. In other words, the minimum unified tree is the most efficient unified tree and includes the fewest number of repeated nodes. To form the minimum unified tree, the controller initiates a minimum unified tree algorithm. The minimum unified tree algorithm identifies all descendents of a set of subtrees. The set of subtrees includes one or more subtrees. The set of subtrees also includes the set of identical lineages described above. The minimum unified tree algorithm then identifies the subtrees in the set of subtrees that includes a most similar set of descendents. The most similar set of descendents includes a most number of same descendents. After identifying the subtrees with the most similar set of descedents, the minimum unified tree merges the subtrees that include the most similar set of descendents.

Figure 3:
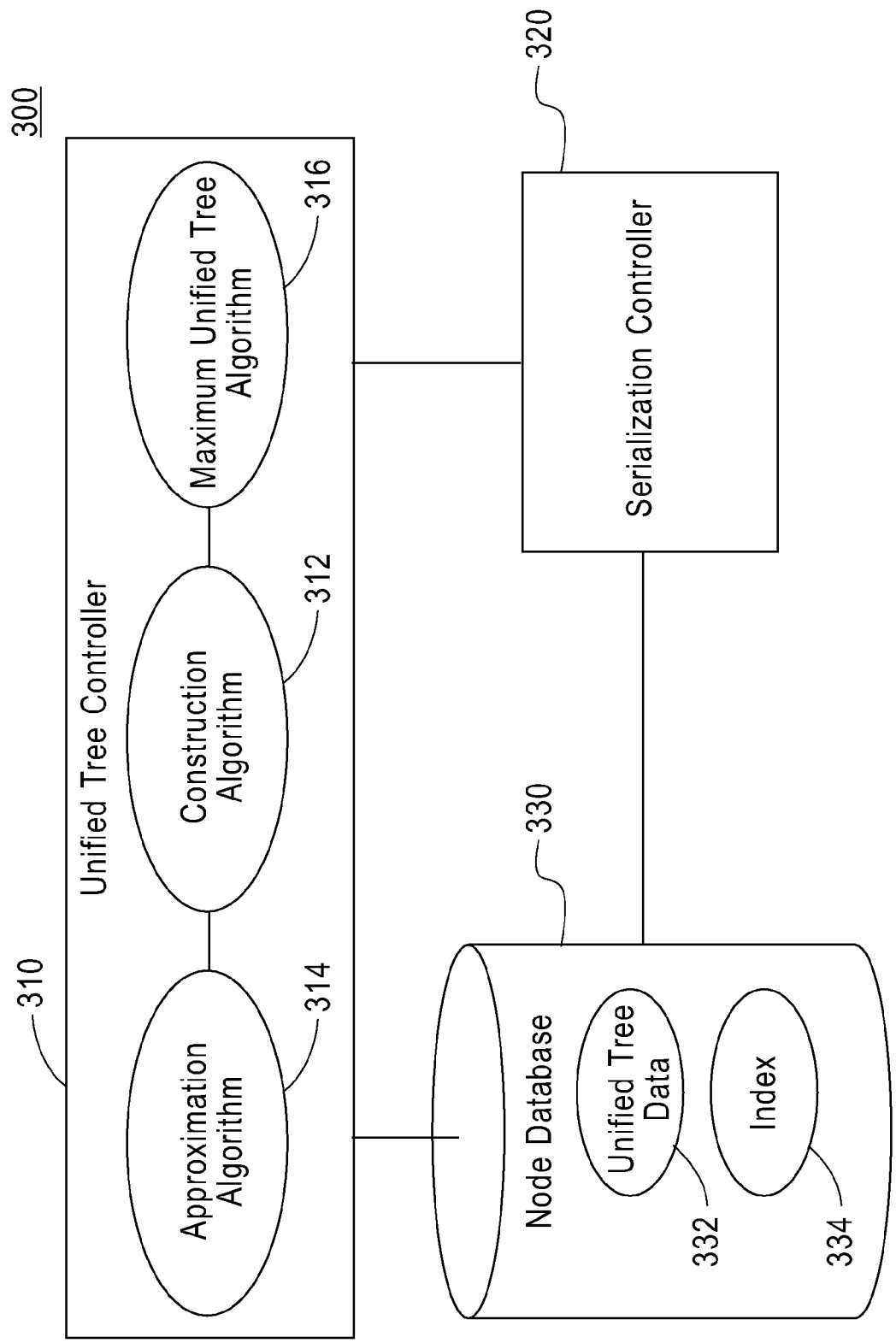
FIG. 3 illustrates a data processing system for indexing documents, in accordance with an illustrative embodiment.

FIG. 3 illustrates a data processing system for indexing documents, in accordance with an illustrative embodiment. Data processing system 300 indexes and serializes extensible Markup Language (XML) documents. Data processing system 300 can be implemented as personal computer 100 of FIG. 1 or data processing system 200 of FIG. 2. Data processing system 300 includes unified tree controller 310, serialization controller 320, and node database 330. In the illustrative embodiment, all components in data processing system 300 are both hardware and software embodiments. However, in alternative embodiments, the components can be an entirely software embodiment or an entirely hardware embodiment.

Unified tree controller 310 forms a unified tree for a set of XML documents within data processing system 300. A tree is a data structure formed with a set of connected nodes. The set of connected nodes has a structure similar to an inverted tree and includes a root node, a set of internal nodes, and a set of leaf nodes. The root node is the top-most node, or the parent node from which all other nodes branch off. A child node descends downward from the root node, with the leaf node being the bottom-most node. The child nodes between the root node and the leaf nodes are considered internal nodes. A subtree typically branches from an internal node, and an internal node includes a set of leaf nodes. Thus, with regard to the subtree, the internal node is considered the root node for that particular subtree. In some circumstances, an internal node can also be the leaf node. In other words, in some circumstances, an internal node does not include any child nodes, nor have any descendants. In the illustrative embodiment, the set of internal nodes and set of leaf nodes can be one or more internal nodes or leaf nodes, respectively.

In the illustrative embodiment, a node and all of the descendents of that node can represent a set of documents, a single document, a portion of the document, an instruction, a line of an instruction, a query, a portion of the query, or a piece of data. For example, consider a tree that represents a set of documents. A set of documents, in this example, is more than one document. Each internal node branching off of the root node includes a subtree. Depending on implementation, each subtree can represent a single document or portions of a set of documents. Furthermore, each subsequent leaf node branching off of the internal node breaks down the subtree into smaller components. In alternative embodiments, the subtrees do not need to be a document at all and can also be any other type of data, such as a query or instruction.

In the illustrative embodiment, a unified tree is a single tree that encompasses a set of XML documents. The set of XML documents can be one or more XML documents which are combined so that similar XML documents, portions of multiple XML documents, or portions of a single XML document are merged together. A portion can be a section or subdivision of a single XML document. The merging of similar XML documents or portions of a single XML document reduces redundancies in the data stored in data processing system 300. Consequently, the storage of the unified tree is smaller than the set of XML documents stored independently of one another, because redundant XML documents and sections are stored only one time versus a number of times. Furthermore, any queries using the unified tree are more efficient, because the overall number of potential query paths is reduced. For instance, data processing system 300 only needs to search one path versus a number of paths to determine and generate the final answer.

Unified tree controller 310 forms a unified tree for data processing system 300. Unified tree controller 310 can be implemented in the processing unit of data processing system 300, similar to processing unit 206 of FIG. 2. Unified tree controller 310 includes construction algorithm 312, approximation algorithm 314, and minimum unified tree algorithm 316. Construction algorithm 312 is the set of instructions for creating the unified tree. To create the unified tree, construction algorithm 312 merges all the applicable document trees in data processing system 300.

To merge all the applicable document trees in data processing system 300, construction algorithm 312 first identifies a virtual root node which exists in a virtual layer directly above the real root node for the identified XML document trees. A virtual root node is a common root node for the identified XML document trees, and may or may not include any data in the virtual root node itself. The purpose of the virtual root node is to facilitate the merging of identified XML document trees into one unified tree.

After identifying a virtual node for each identified XML document tree, construction algorithm 312 merges the virtual root nodes so that a single unified tree is formed. In other words, construction algorithm 312 combines all the identified XML document trees under the virtual root node, with each individual XML document tree branching off of the virtual root node.

Construction algorithm 312 then scans all the XML document trees within the unified tree and begins merging all the identical lineages within the unified tree. Construction algorithm 312 begins the scan in a top-down, left-right format. Thus, construction algorithm 312 first begins comparing the child nodes in the layer directly below the virtual root node. In that layer, construction algorithm 312 starts with the left-most child node and continues to scan to the right. If construction algorithm 312 identifies at least two identical child nodes in the same layer, then construction algorithm 312 identifies the child nodes and all ancestors of the child nodes as identical lineages. If construction algorithm 312 does not identify any identical child nodes, then construction algorithm 312 proceeds to scan the next layer, beginning again with the leftmost child node. The process continues until construction algorithm 312 scans the entire unified tree for identical lineages.

Two XML document trees can be merged if the XML document trees have the exact same lineage. A lineage is a series of nodes beginning with the root node and ending with a leaf node. Two lineages can be merged if two lineages are identical in type and order. In other words, two lineages can be merged if the child node includes identical ancestors up to the root node, and the ancestor nodes are in the same order as the other lineage. Thus, when construction algorithm 312 scans each layer in the unified tree, construction algorithm 312 identifies the lineages that can be merged. After construction algorithm 312 identifies the XML document trees with the same lineages, construction algorithm 312 combines the two XML document trees into one unified tree such that the XML document trees now share the identical lineage under one unified tree.

In certain circumstances, several different unified trees can be formed from the same set of nodes. Based on the way and order the unified tree is constructed, several different combinations of unified trees can develop. Thus, in an alternative embodiment, data processing system 300 can initiate minimum unified tree algorithm 316 to construct the smallest possible unified tree or the unified tree with the fewest number of branches. Essentially, minimum unified tree algorithm 316 forms the most efficient unified tree out of all the possible alternative unified trees.

Minimum unified tree algorithm 316 begins forming the unified tree in a manner similar to construction algorithm 312. Minimum unified tree algorithm 316 first appends a virtual root node to each XML document tree which is to be combined into the unified tree. Minimum unified tree algorithm 316 then merges all the virtual root nodes so that all XML document trees branch off of the same virtual root node and are in a single tree. Minimum unified tree algorithm 316 then begins scanning the single tree for identical lineages.

Once minimum unified tree algorithm 316 identifies more than two identical lineages, minimum unified tree algorithm 316 initializes approximation algorithm 314 to identify the most efficient lineages to merge together. The most efficient lineages are the two lineages whose subtrees include the most number of identical descendents. Thus, approximation algorithm 314 scans the subtrees that include identical lineages. Approximation algorithm 314 then compares and counts the number of identical descendents that exist in each subtree. In this embodiment, an identical descendent is a child node that includes the same data as another child node in another subtree. The subtrees with the most number of identical descendents are identified as the most similar subtrees. Approximation algorithm 314 then merges the most similar subtrees. In another embodiment, approximation algorithm 314 also identifies the order of the child node, and approximation algorithm 314 merges the subtrees with most number of identical descendents that are in the same order.

After the unified tree is formed, construction algorithm 312 assigns an identifier that describes each node. In the illustrative embodiment, the identifier is a 4-tuple label that includes four elements: "label", "left", "right", and "depth". The "label" element is the name of the node, which can be in any format, including but not limited to a single or combination of letters, characters, numbers, or words. The "left" element is the traversal number when construction algorithm 312 enters the particular node. The "right" element is the traversal number when construction algorithm 312 exits the particular node. The "depth" element is the layer in which the particular node resides in the unified tree. In the illustrative embodiment, construction algorithm 312 labels depth first, and then labels from left to right. However, alternatively, construction algorithm 312 can label from left to right first and then depth second. Additionally, in yet another alternative embodiment, construction algorithm 312 can label from right to left.

Serialization controller 320 connects to unified tree controller 310 and can be implemented in the processing unit of data processing system 300. Serialization controller 320 flattens a unified tree into a sequential series to form an index for a particular XML document tree. An index is a list of all the nodes within a document tree or subtree. Serialization controller 320 identifies all the nodes descending from an XML document tree or subtree using the 4-tuple label assigned by unified tree controller 310. An index for each XML document tree and subtree is then generated after serialization controller 320 flattens the unified tree.

Node database 330 connects to unified tree controller 310 and serialization controller 320. Node database 330 is a storage element and can be implemented in the main memory, similar to main memory 208 of FIG. 2, or the hard disk drive, similar to hard disk drive 226 of FIG. 2, of data processing system 300. Node database 330 can store information in any format, including but not limited to a table, a flat file, an extensible Markup Language (XML) file, a relational database management system, or any combination thereof.

Node database 330 includes unified tree data 332 and index 334. Unified tree data 332 stores the unified tree, the relationship of the nodes to the other nodes, such as which node is the root node and which nodes are included in the set of internal nodes and the set of leaf nodes, and the node identifiers for each node within the unified tree. Index 334 includes all the serialized sequences formed by serialization controller 320.

The illustrative embodiments are not limited by the illustrated example. For example, data processing system 300, unified tree controller 310, serialization controller 320, and node database 330 can include more or fewer components. Furthermore, the illustrative embodiments are not limited only to XML documents, and can be implemented using any other type of data, mark-up language, instruction, or query format.

Figure 4:
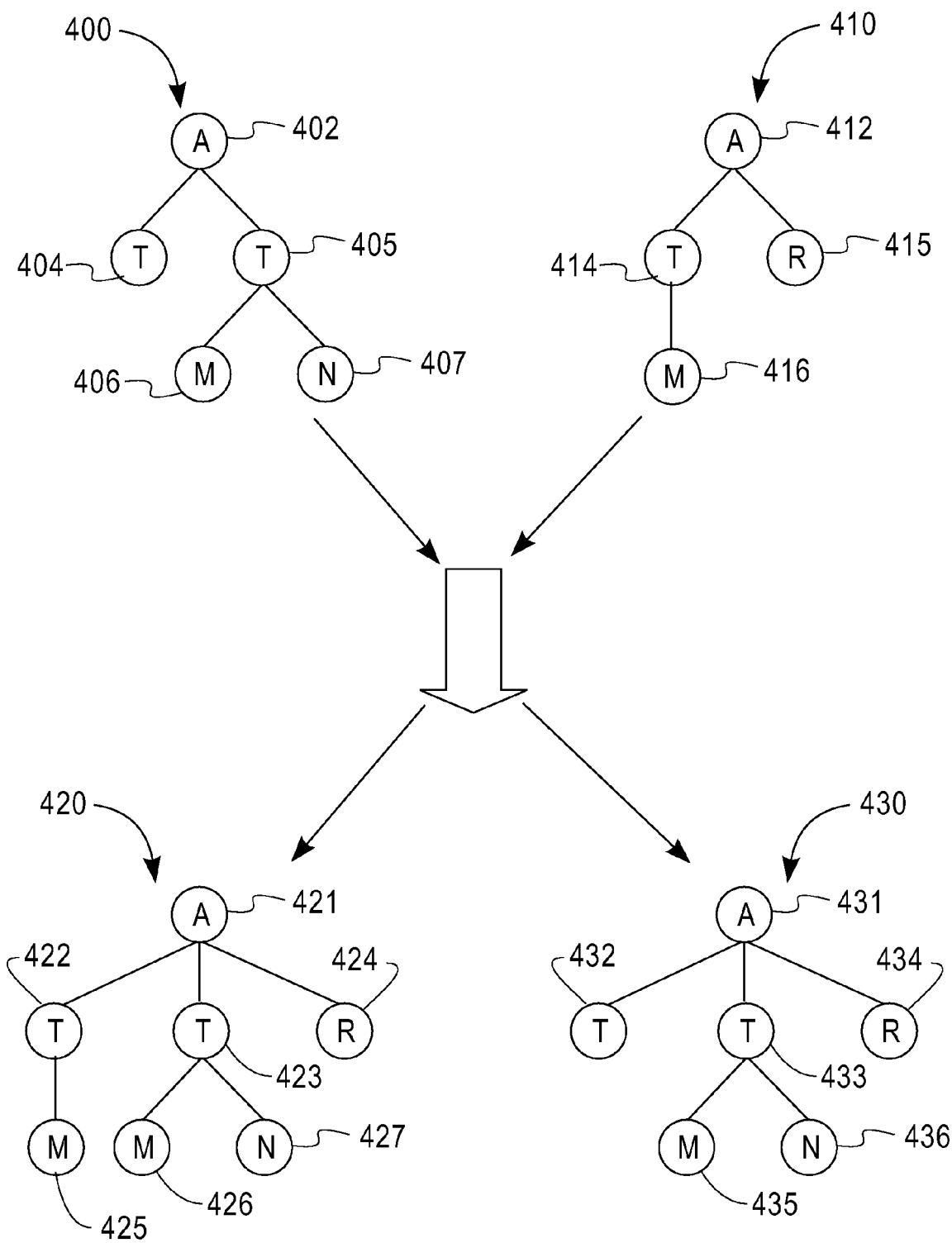
FIG. 4 depicts the formation of a unified tree, in accordance with an illustrative embodiment.

FIG. 4 depicts the formation of a unified tree, in accordance with an illustrative embodiment. The illustrated process can be implemented in a unified tree controller using a construction algorithm, similar to unified tree controller 310 and construction algorithm 312 of FIG. 3.

The illustrative embodiment includes XML document trees 400 and 410 and unified trees 420 and 430. XML document trees 400 and 410 reside within the data processing system and, in the illustrative embodiment, are identified by the unified tree controller as the XML document trees which need to be merged to form a unified tree.

XML document tree 400 includes five nodes and three layers of nodes. Node 402 is labeled as node "A" and is the root node for XML document tree 400. Node 402 resides in the zero layer of XML document tree 400. Nodes 404 through 407 are descendents of node 402. Nodes 404 and 405 are both labeled node "T" and are in the first layer, but node 404 is a leaf node while node 405 is an internal node. Nodes 406 and 407 are descendents of node 405, and are labeled node "M" and "N", respectively. Nodes 406 and 407 are also leaf nodes and reside in the second layer of XML document tree 400.

XML document tree 410 includes four nodes and three layers of nodes. Node 412 is labeled node "A" and is the root node in the zero layer for XML document tree 410. Nodes 414 through 416 descend from node 412. Node 414 is labeled node "T" and is an internal node in the first layer. Node 415 and 416 are leaf nodes and are labeled nodes "R" and "M", respectively. Node 415 is in the first layer, and node 416 is the second layer.

In the illustrative embodiment, two potential unified trees can be formed as a result of the merge of XML document trees 400 and 410: unified tree 420 and unified tree 430. To merge XML document trees 400 and 410, the construction algorithm first identifies the root node for all the XML document trees. In the illustrative embodiment, node "A" (nodes 402 and 412) is the root node for both XML document trees 400 and 410. As a result, the construction algorithm uses node "A" (nodes 402 and 412) as the root node for the unified tree, as shown in unified tree 420 as node 421 and in unified tree 430 as node 431. Alternatively, in the event that the root nodes for the XML document trees are different, the construction algorithm identifies and merges a virtual root node for both XML document trees 400 and 410. The virtual root node would reside in a virtual layer above the zero layer and both node 402 and 412 would descend from the virtual root node.

After identifying the root node, the construction algorithm then scans XML document trees 400 and 410 for identical lineages existing in both XML document trees 400 and 410. In the illustrative embodiment, the construction algorithm scans depth first and then from left-to-right. Thus, in the illustrative embodiment, the construction algorithm scans the first layer of both XML document trees 400 and 410, and identifies nodes "T" (nodes 404, 405, and 414) as identical nodes in both XML document trees 400 and 410. In the illustrative embodiment, nodes 404, 405, and 414 have identical lineages because nodes 404, 405, and 414 have identical ancestors up to the root node. In this case, the only ancestor of nodes 404, 405, and 414 is root node "A" (nodes 402 and 412).

Since node "T" (nodes 404 and 405) appears twice in XML document tree 400, the construction algorithm can choose which node, node 404 or node 405 of XML document tree 400, to merge with node 412 of XML document tree 410. If the construction algorithm chooses to merge node 404 of XMP document tree 400 with node 412 of XML document tree 410, then unified tree 420 is formed with node 422 representing the merged nodes. On the other hand, if the construction algorithm chooses to merge node 405 of XML document tree 400 with node 412 of XML document tree 410, then unified tree 430 is formed with node 433 representing the merged nodes.

For unified tree 430, the construction algorithm also merges node 406 of XML document tree 400 and node 416 of XML document tree 410 since XML document trees 400 and 410 commonly included node "M" (nodes 406 and 416, respectively) as a descendent of node "T" (nodes 405 and 414, respectively). Thus, the lineage of "A"-"T"-"M" is considered an identical lineage that exists in both XML document trees 400 and 410, thereby allowing for the identical lineages to be merged. The merged lineage is represented as nodes 433, 435, and 436 in unified tree 430. In an alternative embodiment, the construction algorithm may not merge the identical lineages, but may maintain node "M" as a separate branch descending from node "T" in a unified tree.

The merging of identical lineages actually merges XML document trees 400 and 410. In the illustrative embodiment, nodes "T", "R", "M", and "N" maintain the same left-to-right order in unified trees 420 and 430 as originally arranged in XML document trees 400 and 410. Therefore, in the illustrative embodiment node "R" is to the right of all "T" nodes. Furthermore, node 405 is to the right of node 404 in XML document tree 400. Therefore, if node 404 of XML document tree 400 merges with node 412 of XML document tree 410, then node 405 of XML document tree 400 is still to the right of node 404 of XML document tree 400 as shown as node 423 of unified tree 420. If node 405 of XML document tree 400 merges with node 412 of XML document tree 410 as illustrated in unified tree 430, node 433, which is representative of merged nodes 405 and 412, maintains the same left-to-right position as originally positioned in XML document tree 400. Thus, node 433 is to the right of node 432 in unified tree 430.

If additional XML document trees exist, then the construction algorithm merges two XML document trees at a time. Thus, in the illustrative embodiment, the construction algorithm would first merge XML document trees 400 and 410 to form either unified tree 420 or 430. The construction algorithm would then merge the next XML document tree with either unified tree 420 or 430 to form another unified tree that includes all three XML document trees. This process is continued until all identified XML document trees are merged into a single unified tree.

Unified trees 420 and 430 are two embodiments resulting from the merging and appending of all nodes from XML document trees 400 and 410. Unified tree 420 includes root node 421, internal nodes 422 and 423, and leaf nodes 424, 425, 426, and 427. Unified tree 430 includes root node 431, internal node 433, and leaf nodes 432, 434, 435, and 436.

In the illustrative embodiment, unified tree 430 is a minimum unified tree or a unified tree with a minimum number of branches. A minimum unified tree efficiently maximizes an index, because each node in the minimum unified tree is repeated a minimum number of times. In use, the unified tree controller initiates a minimum unified tree algorithm and approximation algorithm, similar to minimum unified tree algorithm 316 and approximation algorithm 314 of FIG. 3, to form a unified tree.

The illustrative embodiment is not limited to the illustrated example. For example, the illustrative embodiment can include more XML document trees, or more or fewer nodes within each XML document tree. Additionally, the illustrative embodiment can merge query trees instead of XML document trees. Furthermore, the illustrative embodiment is not limited to XML document trees and can be applied to any type of markup language, query, or set of instructions.

FIG. 5 is a minimum unified tree algorithm, in accordance with an illustrative embodiment. Algorithm 500 is a minimum unified tree algorithm, similar to minimum unified tree algorithm 316 of FIG. 3. In use, algorithm 500 can form a minimum unified tree, similar to unified tree 430 of FIG. 4.

$T_D = \{T_1, T_2, \ldots, T_n\}$ in line 510 represents the set of XML document trees that need to be merged using algorithm 500. "Minimum Unified Tree" in line 520 is the output produced after processing algorithm 500. Lines 530 through 537 are the basic framework or algorithm for finding the minimum unified tree for the set of XML document trees $T_D$. Algorithm 500 begins by identifying and appending the root node for the minimum unified tree (line 531). Thus, for all the XML document trees $T_i$ included in the set of XML document trees $T_D$ (line 532), algorithm 500 establishes node $r_i$ to be the root node for $T_i$ (line 533). Algorithm 500 then runs the procedure named MergeAsChild to merge all common nodes in the set of XML document trees $T_D$ (line 534). Algorithm 500 then removes all the labels previously assigned to the XML document trees (line 535), thereby resulting in the formation of the minimum unified tree (line 536). The algorithm ends thereafter (line 537).

Lines 540 through 551 detail the procedure named MergeAsChild, which is referenced in line 534 of the algorithm beginning on line 530. The MergeAsChild procedure includes node u and node w (line 540), where θ represents all nodes in the set of XML document trees $T_D$ with the same label as node u, and is a descendent of node w (line 541). If θ=0, or, in other words, if none of the lineages in the set of XML document trees $T_D$ are identical, then the set of XML document trees $T_D$ is appended as a child node to node w (lines 542 and 543). Otherwise, if identical lineages in the set of θ exist, then the MergeAsChild procedure runs the GetSimilarity function (lines 545 and 546). The XML document subtrees in the set of XML document trees $T_D$ with the maximum number of similar descendents are merged together and then appended to node w (lines 547 through 551).

Lines 560 through 564 describe the function GetSimilarity, which is referenced in line 546 of the MergeAsChild procedure. The GetSimilarity function can be implemented as approximation algorithm 314 of FIG. 3. The GetSmilarity function reviews nodes x and y, which are XML document subtrees within the set of XML document trees $T_D$ (line 560). The GetSimilarity function scans all the descendents within nodes x and y, and determines which descendents are in both nodes x and y (lines 561 and 562). The GetSimilarity function returns a value that represents the total number of common descendents in both nodes x and y plus one (line 563). The value represents the nodes that have the most number of common descendents, thereby indicating that the identified nodes are to be merged to form a minimum unified tree.

Algorithm 500 is not limited to the illustrative embodiments. For example, algorithm 500 can include more or fewer lines and additional processes without deviating from the scope of the illustrative embodiment. Moreover, algorithm 500 can also include a procedure for comparing the order of all common descendents to form the minimum unified tree. Furthermore, algorithm 500 is not limited only to XML documents, and can be applied to any other type of mark-up language, instruction, or query format.

Figure 6:
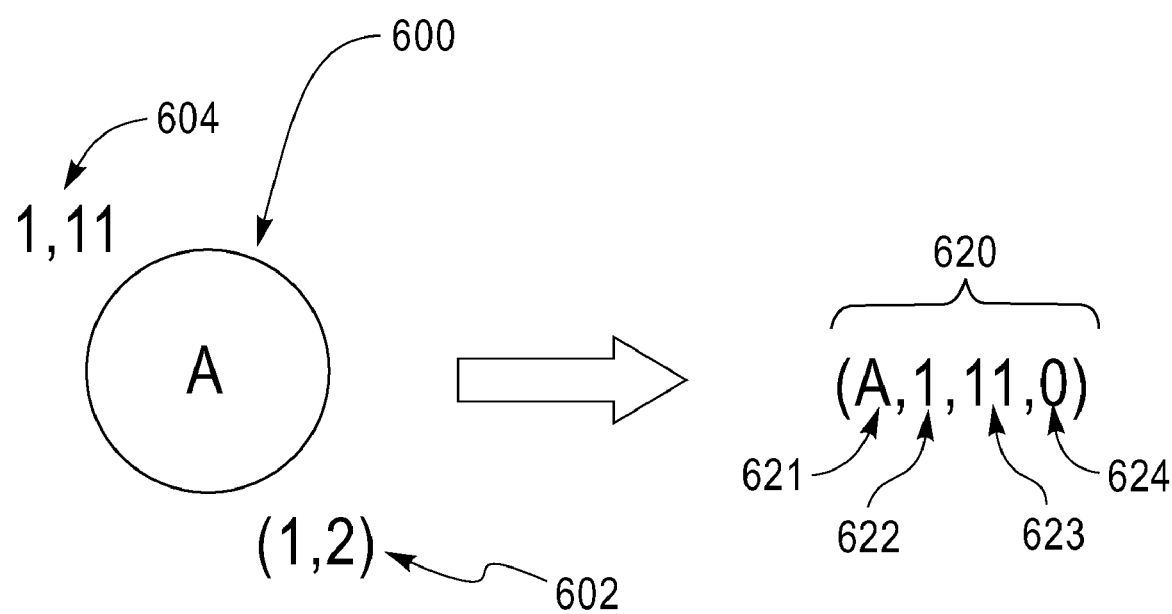
FIG. 6 illustrates an example identifier for a node, in accordance with an illustrative embodiment.

FIG. 6 illustrates an example identifier for a node, in accordance with an illustrative embodiment. The process of assigning an identifier that describes the node can be executed by the unified tree controller, similar to unified tree controller 310 of FIG. 3.

The illustrative embodiment includes node 600 which is assigned 4-tuple label 620. In the illustrative embodiment, node 600 is a root node, similar to root node 421 or 431 of FIG. 4. Node 600 is labeled node "A" in the illustrative embodiment, but node 600 can also be in the form of a number of alternative labeling constructions, including but not limited to a number, a name of a book, the name of the author, the date of creation, or any other similar naming convention.

Node 600 includes marker 602 and "left,right" element 604. Marker 602 identifies the set of XML document trees from which node 600 originated prior to forming the unified tree. In the illustrative embodiment, node 600 originated from two XML document trees: XML document tree "1" and XML document tree "2". Therefore, marker 602 lists both XML document trees in the following format: "(1,2)".

Node 600 also includes "left,right" element 604, specifically shown as "1, 11" to the upper left-hand corner of node 600. The "left" element is the traversal number when the unified tree controller enters the particular node. In executing the labeling algorithm, unified tree controller begins with the root node. Therefore, since node 600, or node "A" is the root node for the illustrative embodiment, the unified tree controller assigns the number "1" to "left" element for node 600. If node 600 was not the root node, the unified tree controller would assign the next traversal number, or the number of the previously traversed node plus one.

The "right" element is the traversal number when the unified tree controller exits the particular node. In other words, the "right" element is one number greater than the "right" element for the right-most node at the bottom-most layer of the tree branching from the particular node. Similar to when nodes are appended to a root node, the unified tree controller assigns the "left" and "right" elements using a depth first and then left-to-right positioning. Therefore, the last node that is assigned is the right-most node at the bottom-most layer of the tree. The illustrative embodiment does not illustrate the tree branching from node 600. However, if a tree were illustrated, then the "right" element for the bottom-most layer of the tree would be assigned the number ten (10), because the "right" element for node 600 is "11".

4-tuple label 620 is the 4-tuple label assigned to node 600 by the unified tree controller. 4-tuple label 620 includes four elements: "label" element 621, "left" element 622, "right" element 623, and "depth" element 624. "Label" element 621 is the name of node 600, which, in the illustrative embodiment, is "A". "Left" element 622 is the same as the "left" element in "left,right" element 604, which is the number "1". "Right" element 623 is the same as the "right" element in "left,right" element 604, which is the number "11". "Depth" element 624 is the layer in which node 600 resides in the unified tree. Since node 600 is the root node of the unified tree, node 600 resides in the zero layer of the unified tree. Thus, "depth" element 624 is shown as the number "0" in 4-tuple label 620.

Figure 7:
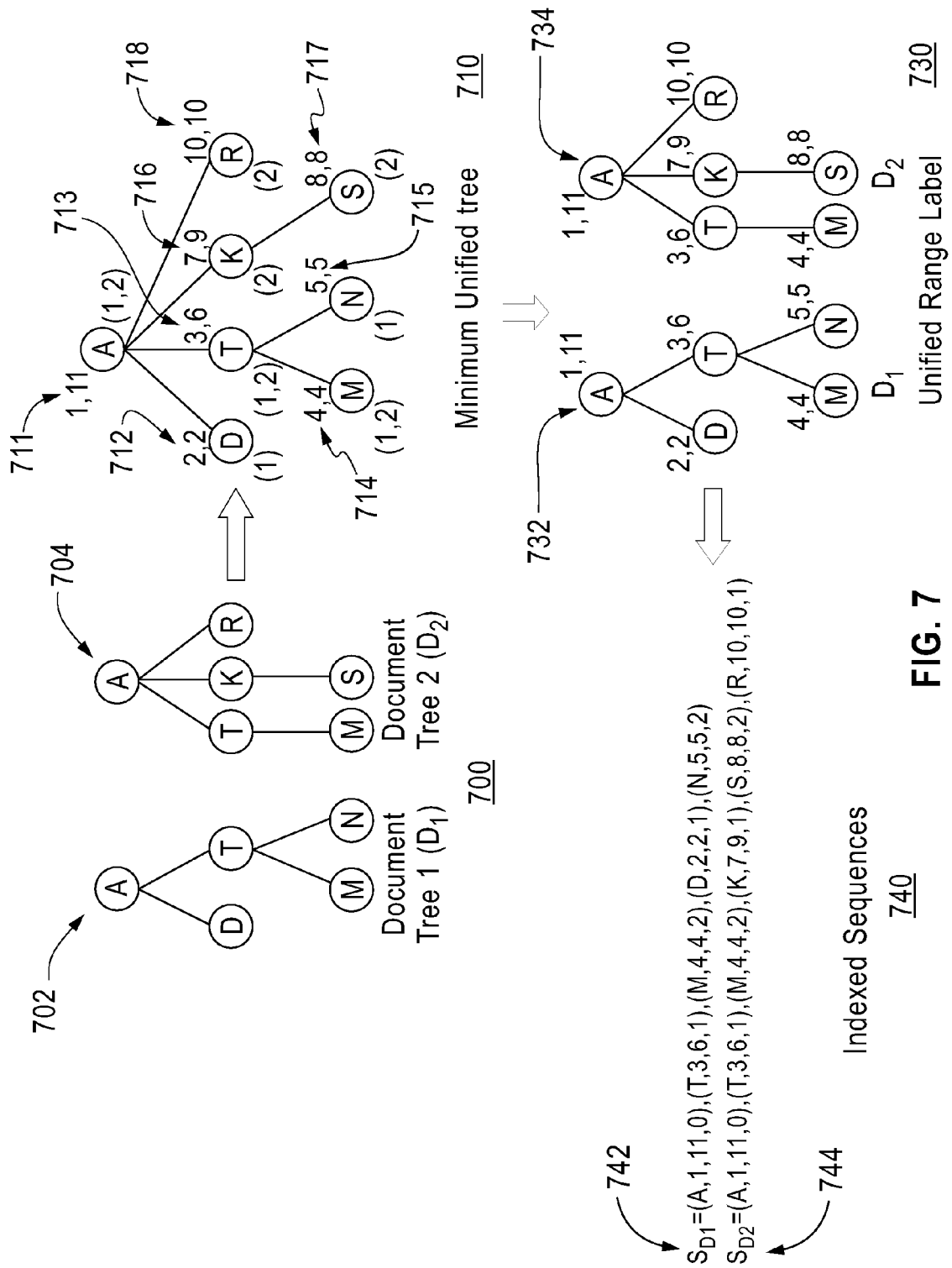
FIG. 7 graphically illustrates the process of indexing a set of XML documents, in accordance with an illustrative embodiment.

FIG. 7 graphically illustrates the process of indexing a set of XML documents, in accordance with an illustrative embodiment. The process can be implemented in data processing system 300 of FIG. 3. The process includes steps 700 through 740.

In step 700, a unified tree controller, similar to unified tree controller 310 of FIG. 3, identifies all the XML document trees in the data processing system that need to be merged to form a unified tree. Specifically, in the illustrative embodiment, the unified tree controller identifies XML document trees 702 and 704. In the illustrative embodiment, both XML document trees 702 and 704 have the same root node, specifically root node "A". However, in an alternative embodiment, XML document trees 702 and 704 can have different root nodes.

In the illustrative embodiment, the descendents of root node "A" in XML document tree 702 differ from the descendents of root node "A" in XML document tree 704. In XML document tree 702, nodes "D", "T", "M", and "N" all descend from root node "A" and are considered child nodes to root node "A". Nodes "D" and "T" are in the first layer of XML document tree 702, and nodes "M" and "N" are in the second and bottom layers of XML document tree 702. Node "T" is an internal node and includes a subtree with nodes "M" and "N" as descendents. Nodes "D", "M", and "N" are leaf nodes.

In XML document tree 704, root node "A" has nodes "T", "K", "R", "M", and "S" as descendents and child nodes. Nodes "T", "K", and "R" are in the first layer of XML document tree 704, with nodes "M" and "S" in the second layer. Node "T" is an internal node and has node "M" as a descendent. Node "K" is also an internal node and has node "S" as a child node. Node "R" has no descendents and is considered a leaf node. Nodes "M" and "S" are also leaf nodes.

In step 710, the unified controller forms a minimum unified tree using a construction algorithm similar to construction algorithm 312 of FIG. 3. Therefore, in the illustrative embodiment, the unified controller initiates the minimum unified tree algorithm and the approximation algorithm, similar to algorithm 500 of FIG. 5.

In step 710, the illustrated minimum unified tree is the result of merging XML document trees 702 and 704. Node "A" is identified as the root node. If a common root node is not identified, then a virtual root node is appended to XML document trees 702 and 704, and the virtual root nodes are merged to form the minimum unified tree in step 710. The unified controller then identifies an identical lineage in document trees 702 and 704. After at least one set of identical lineages is identified, the unified controller executes the minimum unified tree algorithm and the approximation algorithm to merge XML document trees 702 and 704 in the most efficient manner. The XML document subtrees with the most similar nodes are identified and merged. The resulting minimum unified tree is reflected in step 710.

In the illustrative embodiment, each node illustrated in step 710 includes a marker which identifies which XML document tree the node originated from. The markers in the minimum unified tree are identified by "( )", with the originating XML document tree number shown in the parenthesis. A marker with the number "1" indicates that the corresponding node originated from XML document tree 1, shown as XML document tree 702 in step 700. A marker with the number "2" indicates that the corresponding node originated from XML document tree 2, shown as XML document tree 704 in step 700.

In step 710, the unified tree controller assigns an identifier, specifically, a 4-tuple label, to each node within the tree. In the illustrative embodiment, each node is already identified by a letter. Thus, in the illustrative embodiment, the unified tree controller maintains the label and assigns the "label" element in the 4-tuple label as the existing label. However, in alternative embodiments, the unified tree controller can change all the existing "labels" to an alternative identifier. In yet another alternative, in the case where XML document trees 702 and 704 do not already include a "label", then the unified tree controller can assign the "label" element before or after the minimum unified tree is constructed.

The unified tree controller then determines the "depth" element of the label. In the illustrative embodiment, the unified tree controller identifies the "depth" element of root node "A" as the zero layer, the "depth" element of nodes "D", "T", "K", and "R" as the first layer, and the "depth" element of nodes "M", "N", and "S" as the second layer of the minimum unified tree.

The unified tree controller then assigns the "left" and "right" elements of the 4-tuple labels. The "left" and "right" elements are exemplified as "left, right" elements 711 through 718. Similar to when the nodes are appended to root node "A", the unified tree controller assigns the "left" and "right" elements using depth first and left-to-right positioning second. Thus, in looking at depth first, the unified tree controller begins at the zero level or with root node "A". The "left" element is the traversal number when the unified tree controller enters the particular node. Thus, for root node "A", the unified tree controller assigns the number "1" to the "left" element for root node "A", because root node "A" is the first node in which the unified tree controller traverses in the minimum unified tree.

The "right" element is the traversal number when the unified tree controller exits the particular node. In other words, the "right" element is one more than the "right" element for the right-most node at the bottom-most layer of that particular tree. For root node "A", the right-most node at the bottom-most layer of the minimum unified tree is node "R". The unified tree controller assigned the "left" element for node "R" as the number "10" ("left,right" element 718). Therefore, the "right" element for node "A" is one more than the "right" element for node "R". Therefore, the "right" element for node "A" is "11". Accordingly, the "left" and "right" elements are formatted as "1,11" as shown in "left,right" element 711 in the illustrative embodiment. In use, the "right" element for root node "A" will probably be assigned after the entire tree is traversed and the "left" and "right" elements are assigned to all nodes.

After identifying the "left" and "right" elements for the zero level, the unified tree controller traverses the first layer of the minimum unified tree, beginning with the left-most node. In the illustrative embodiment, node "D" is the left-most node in the first layer. Therefore, the unified tree controller assigns the "left" element for node "D" as the number "2". Since node "D" does not have any descendents, the "right" element for node "D" is also the number "2". Thus, "left,right" element 712 is "2,2" for node "D".

The unified tree controller then travels to the right of node "D" and begins the process of labeling node "T". The unified tree controller assigns the number "3" to node "T" as the next traversed node after node "D". Since node "T" includes a subtree or has two child nodes, the unified tree controller traverses the first layer below node "T", which includes nodes "M" and "N". Beginning with the left-most node, the unified tree controller assigns a "left" element to node "M" of "4" and to node "N" of "5". Since nodes "M" and "N" are leaf nodes and do not have any child nodes, the unified tree controller assigns the same number in the "left" element to the "right" element. Therefore, "left,right" element 714 is "4,4" for node "M", and "left,right" element 715 is "5,5" for node "N". After assigning the "left" and "right" elements to nodes "M" and "N", the unified tree controller assigns the "right" element to node "T" as one more than the "right" element of node "N". Since node "N" is the bottom-most, and right-most node in the subtree for node "N", then the "left" element for node "N" becomes the "right" element for node "T". Therefore, node "T" has "left,right" element 713 of "3,6".

The unified tree controller continues assigning the "left" and "right" elements to nodes "K", "S", and "R". Node "K" has "left,right" element 716 of "7,9". Node "S" has "left, right" element 717 of "8,8". Node "R" has "left,right" element 718 of "10,10".

After the unified tree controller assigns a 4-tuple label to each node in the minimum unified tree, the serialization controller splits the minimum unified tree into sequential series. The serialization controller can be implemented as serialization controller 320 of FIG. 3. The serialization controller indexes the minimum unified tree illustrated in step 710 so that all the nodes for each tree and subtree are identified.

To index the minimum unified tree illustrated in step 710, the serialization controller first splits the minimum unified tree back into the original XML document tree structures. Thus, step 730 reflects the similar XML document tree structures represented in step 700. Therefore, XML document tree 732 is similar to XML document tree 702, and XML document tree 734 is similar to XML document tree 704. However, XML document trees 732 and 734 maintain the same 4-tuple label assigned in step 710 instead of the label that may have been assigned in step 700.

After splitting the minimum unified tree back into the original XML document tree structures, the serialization controller then flattens each XML document tree into a sequential series in step 740. Thus, sequential series 742 is the flattened tree for XML document tree 732, and sequential series 744 is the flattened tree for XML document tree 734. Sequential series 742 is represented as $S_{D1}$ and lists all the 4-tuple labels for all nodes within XML document tree 732. Sequential series 744 is represented as $S_{D2}$ and lists all the 4-tuple labels for all nodes within XML document tree 734. Sequential series 742 and sequential series 744 represent the index for all the XML document trees in the data processing system.

The illustrative embodiments are not limited to the illustrated example. For example, more XML document trees can be included. Additionally, the illustrative embodiment is not limited to XML documents, and can be applied to any other type of mark-up language, instruction, or query format.

Figure 8:
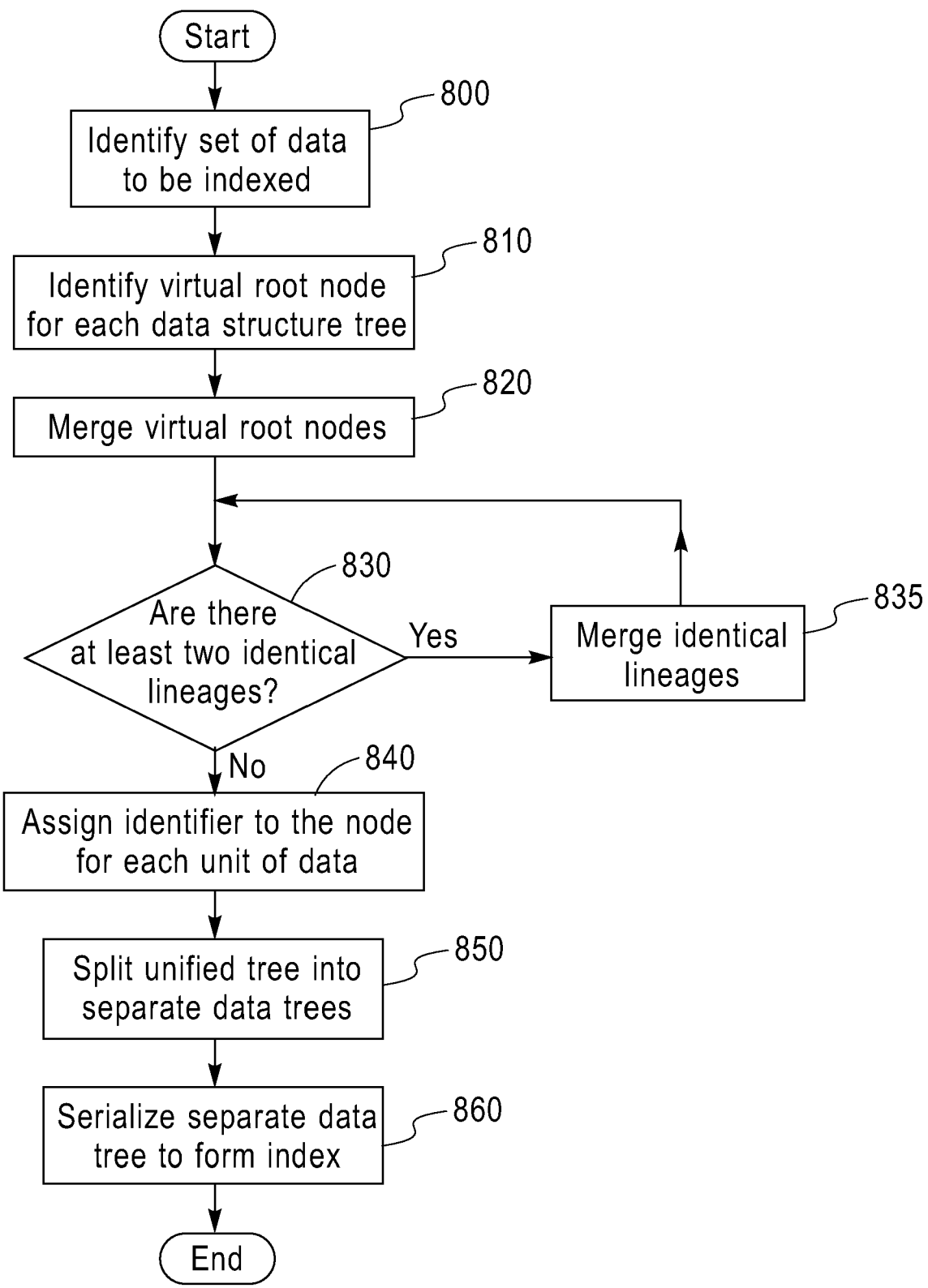
FIG. 8 is a flowchart illustrating the process for indexing data, in accordance with an illustrative embodiment.

FIG. 8 is a flowchart illustrating the process for indexing data, in accordance with an illustrative embodiment. The process can be executed in a data processing system similar to data processing system 300 of FIG. 3. The following process is exemplary only and the order of the steps may be interchanged without deviating from the scope of the invention.

The process begins with a unified tree controller identifying a set of data to be indexed (step 800). In other words, the unified tree controller identifies a set of XML document trees that need to be merged to form a unified tree. To begin the merging process, the unified tree controller identifies a virtual node for each data structure tree (step 810). The unified tree controller then merges the virtual root nodes for each data structure tree to form a unified tree (step 820). The unified tree controller then determines whether at least two identical lineages are present in the unified tree (step 830). If at least two identical lineages exist in the unified tree ("yes" output to step 830), the unified tree controller merges the identical lineages (step 835). The process then repeats and returns to step 830.

Returning to step 830, if at least two identical lineages do not exist in the unified tree ("no" output to step 830), then the unified tree algorithm assigns an identifier to each node for each unit of data in the unified tree (step 840). The serialization controller then splits the unified tree into separate data structure trees (step 850). The serialization controller then serializes the separate trees to form an index (step 860), with the process terminating thereafter.

The illustrated process forms a minimum unified tree. If the unified tree controller does not form a minimum unified tree, then steps 830 through 835 are eliminated from the illustrated process.

Thus, the illustrative embodiments provide a computer implemented method, an apparatus, and a computer usable program product for indexing data. A controller identifies a set of data to be indexed. A set of data can be any set of information, including but not limited to a set of documents, instructions, or queries. A set of data structure trees represents the set of data.

The controller merges the set of data structure trees to form a unified tree. The unified tree contains a node for each unit of data in the set of data structure trees. Each unit of data in the set of data structure trees can represent any portion or section of the data, with each unit of data being the same or of a different size. To merge the set of data structure trees to form a unified tree, the controller first creates a virtual root node for each data structure tree in the set of data structure trees. A virtual root node is a root node that is identical for each data structure tree. The virtual root node may or may not include any information, but the purpose of the virtual root node is to establish a common node from which all the data structure trees can branch.

After identifying the virtual root node for each data structure tree, the controller merges the virtual root nodes for each data structure tree so that all data structure trees are included in a unified tree. After merging the virtual root nodes, the controller identifies a set of identical lineages. An identical lineage is a set of descendent nodes which are identical in type and order as another lineage. The controller then merges the set of identical lineages.

The controller then assigns an identifier to each node that describes the node within the unified tree. In the illustrative embodiments, the identifier can be a 4-tuple label that includes a label element, a left element, a right element, and a depth position element. The left element is the traversal number when the controller enters the node, while the right element is the traversal number when the controller exits the node.

After assigning the identifier, the controller serializes the unified tree to form a set of sequential series that represents the set of data structure trees. The serialization of the unified tree flattens the unified tree so that each node is listed by the identifier. To serialize the unified tree, the controller splits the unified tree into the original set of data structure trees. The controller then flattens the set of data structure trees into a set of sequential series. The set of sequential series includes the identifier for each node in the corresponding data structure tree. The controller then lists the identifier for each node in the corresponding data structure tree. The set of sequential series forms an index for the set of data structure trees.

In an alternative embodiment, the unified tree is a minimum unified tree. A minimum unified tree is a unified tree with the fewest number of branches. In other words, the minimum unified tree is the most efficient unified tree and includes the fewest number of repeated nodes. To form the minimum unified tree, the controller initiates a minimum unified tree algorithm. The minimum unified tree algorithm identifies all descendents of a set of subtrees. The set of subtrees includes one or more subtrees. The set of subtrees also includes the set of identical lineages described above. The minimum unified tree algorithm then identifies the subtrees in the set of subtrees that includes a most similar set of descendents. The most similar set of descendents includes the most number of same descendents. After identifying the subtrees with the most similar set of descedents, the minimum unified tree merges the subtrees that include the most similar set of descendents.

The illustrative embodiments provide a method for creating indexes that do not require intermediate joining operations. Additionally, the method allows for data to be easily and accurately converted between a tree structure and a sequence-based structure. Moreover, the method allows for data to be stored in the most efficient manner, thereby creating a smaller index. As a result, costs associated with expensive joining operations and storage of large indexes are reduced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for indexing data, the computer implemented method comprising:
   identifying by using one or more processors a set of data to be indexed, wherein a set of data structure trees represents the set of data to be indexed;
   responsive to each data structure tree in the set of data structure trees lacking a common root node, creating a virtual root node for each data structure tree in the set of data structure trees;
   using one or more processors, merging the set of data structure trees to form a unified tree, wherein the unified tree is a single tree, and wherein the unified tree contains a set of nodes and each node in the set of nodes represents a unit of data in the set of data to be indexed;
   responsive to forming the unified tree, assigning by one or more processors a marker to each node in the unified tree, wherein the marker identifies each data structure tree in the set of data structure trees that each node originated from;
   responsive to forming the unified tree, assigning by one or more processors an identifier to each node in the unified tree, wherein the identifier describes the node in the unified tree; and
   responsive to assigning by one or more processors an identifier to each node in the unified tree, serializing the unified tree to form a set of sequential series, wherein the set of sequential series represents the set of data structure trees, and wherein the set of sequential series forms an index for the set of data to be indexed.

2. The computer implemented method of claim 1, wherein the step of merging the set of data structure trees to form a unified tree containing a node for each data in the set of data to be indexed comprises:
   responsive to each data structure tree in the set of data structure trees lacking a common root node, creating a virtual root node for each data structure tree in the set of data structure trees, wherein the virtual root node for each data structure tree is identical; wherein the virtual root node for each data structure tree exists in a virtual layer directly above a root node for each data structure tree in the set of data structure trees; and wherein the root node is a top-most node from which all other nodes branch off;
   identifying a virtual root node for each data structure tree in the set of data structure trees;
   merging the virtual root node for each data structure tree in the set of data structure trees to form a new virtual root node for the unified tree, wherein the unified tree comprises each data structure tree in the set of data structure trees, and wherein each data structure tree in the set of data structure trees branch from the new virtual root node;
   responsive to merging the virtual root node for each data structure tree in the set of data structure trees, and forming the unified tree, identifying a set of identical lineages in the unified tree, wherein each identical lineage in the set of identical lineages comprises identical descendant nodes descending in an identical order; and
   merging the set of identical lineages.

3. The computer implemented method of claim 2, wherein the unified tree is a minimum unified tree, wherein the minimum unified tree has a fewest number of branches and a fewest number of repeated nodes, and wherein the step of merging the set of identical lineages comprises initiating a minimum unified tree algorithm.

4. The computer implemented method of claim 3, wherein the minimum unified tree algorithm comprises:
   identifying all descendent nodes of a set of subtrees, wherein the set of subtrees comprises the set of identical lineages;
   identifying subtrees in the set of subtrees that comprise a most similar set of descendent nodes, wherein the most similar set of descendent nodes comprises a most number of same descendent nodes; and
   merging the subtrees in the set of subtrees that comprise the most similar set of descendent nodes.

5. The computer implemented method of claim 1, wherein the identifier comprises a 4-tuple label, and wherein the 4-tuple label comprises a label element, a left element, a right element, and a depth position element.

6. The computer implemented method of claim 5, wherein the left element comprises a traversal number when entering a node, and wherein the right element comprises the traversal number when exiting the node.

7. The computer implemented method of claim 1, wherein the step of serializing the unified tree to form a set of sequential series that represents the set of data structure trees comprises:
   splitting the unified tree back into each data structure tree in the set of data structure trees that existed prior to merging the set of data structure trees;
   flattening the set of data structure trees into a set of sequential series that comprises the identifier for each node in a corresponding data structure tree; and listing the identifier for the each node in the corresponding data structure tree to form the index for the set of data to be indexed.

8. An apparatus for indexing data, the apparatus comprising:
- a bus;
- a storage device connected to the bus, wherein the storage device contains a computer usable program product, and wherein the computer usable program product contains a plurality of instructions; and
- a processor unit connected to the bus, wherein the plurality of instructions causes the processor unit to perform steps comprising:
  - identifying a set of data to be indexed, wherein a set of data structure trees represents the set of data to be indexed;
  - responsive to each data structure tree in the set of data structure trees lacking a common root node, creating a virtual root node for each data structure tree in the set of data structure trees;
  - using a processor, merging the set of data structure trees to form a unified tree, wherein the unified tree is a single tree, and wherein the unified tree contains a set of nodes and each node in the set of nodes represents a unit of data in the set of data to be indexed;
  - responsive to forming the unified tree, assigning a marker to each node in the unified tree, wherein the marker identifies each data structure tree in the set of data structure trees that each node originated from;
  - responsive to forming the unified tree, assigning an identifier to each node in the unified tree, wherein the identifier describes the node in the unified tree; and
  - responsive to assigning an identifier to each node in the unified tree, serializing the unified tree to form a set of sequential series, wherein the set of sequential series represents the set of data structure trees, and wherein the set of sequential series forms an index for the set of data to be indexed.

9. The apparatus of claim 8, wherein the step of merging the set of data structure trees to form a unified tree containing a node for each data in the set of data to be indexed comprises:
- responsive to each data structure tree in the set of data structure trees lacking a common root node, creating a virtual root node for each data structure tree in the set of data structure trees, wherein the virtual root node for each data structure tree is identical; wherein the virtual root node for each data structure tree exists in a virtual layer directly above a root node for each data structure tree in the set of data structure trees; and wherein the root node is a top-most node from which all other nodes branch off and;
- identifying a virtual root node for each data structure tree in the set of data structure trees;
- merging the virtual root node for each data structure tree in the set of data structure trees to form a new virtual root node for the unified tree, wherein the unified tree comprises each data structure tree in the set of data structure trees, and wherein each data structure tree in the set of data structure trees branch from the new virtual root node;
- responsive to merging the virtual root node for each data structure tree in the set of data structure trees, and forming the unified tree, identifying a set of identical lineages in the unified tree, wherein each identical lineage in the set of identical lineages comprises identical descendant nodes descending in an identical order; and
- merging the set of identical lineages.

10. The apparatus of claim 9, wherein the unified tree is a minimum unified tree, wherein the minimum unified tree has a fewest number of branches and a fewest number of repeated nodes, and wherein the unified tree controller initializes a minimum unified tree algorithm to merge the set of identical lineages.

11. The apparatus of claim 10, wherein the minimum unified tree algorithm comprises:
- identifying all descendent nodes of a set of subtrees, wherein the set of subtrees comprises the set of identical lineages;
- identifying subtrees in the set of subtrees that comprise a most similar set of descendent nodes, wherein the most similar set of descendent nodes comprises a most number of same descendent nodes; and
- merging the subtrees in the set of subtrees that comprise the most similar set of descendent nodes.

12. The apparatus of claim 8, wherein the identifier comprises a 4-tuple label, and wherein the 4-tuple label comprises a label element, a left element, a fight element, and a depth position element.

13. A computer program product comprising:
- a computer useable storage medium having a computer usable program code for indexing data, the computer usable program code causing a computer to perform steps comprising:
  - identifying a set of data to be indexed, wherein a set of data structure trees represents the set of data to be indexed;
  - responsive to each data structure tree in the set of data structure trees lacking a common root node, creating a virtual root node for each data structure tree in the set of data structure trees;
  - using a processor, merging the set of data structure trees to form a unified tree, wherein the unified tree is a single tree, and wherein the unified tree contains a set of nodes and each node in the set of nodes represents a unit of data in the set of data to be indexed;
  - responsive to forming the unified tree, assigning a marker to each node in the unified tree, wherein the marker identifies each data structure tree in the set of data structure trees that each node originated from;
  - responsive to forming the unified tree, assigning an identifier to each node in the unified tree, wherein the identifier describes the node in the unified tree; and
  - responsive to assigning an identifier to each node in the unified tree, serializing the unified tree to form a set of sequential series, wherein the set of sequential series represents the set of data structure trees, and wherein the set of sequential series forms an index for the set of data to be indexed.

14. The computer program product of claim 13, wherein the step of merging the set of data structure trees to form a unified tree containing a node for each data in the set of data to be indexed comprises:
- responsive to each data structure tree in the set of data structure trees lacking a common root node, creating a virtual root node for each data structure tree in the set of data structure trees, wherein the virtual root node for each data structure tree is identical; wherein the virtual root node for each data structure tree exists in a virtual layer directly above a root node for each data structure tree in the set of data structure trees; and wherein the root node is a top-most node from which all other nodes branch off and;
- identifying a virtual root node for each data structure tree in the set of data structure trees;

merging the virtual root node for each data structure tree in the set of data structure trees to form a new virtual root node for the unified tree, wherein the unified tree comprises each data structure tree in the set of data structure trees, and wherein each data structure tree in the set of data structure trees branch from the new virtual root node;

responsive to merging the virtual root node for each data structure tree in the set of data structure trees, and forming the unified tree, identifying a set of identical lineages in the unified tree, wherein each identical lineage in the set of identical lineages comprises identical descendant nodes descending in an identical order; and merging the set of identical lineages.

15. The computer program product of claim 14, wherein the unified tree is a minimum unified tree wherein the unified tree is a minimum unified tree, wherein the minimum unified tree has a fewest number of branches and a fewest number of repeated nodes and wherein the step of merging the set of identical lineages comprises initiating a minimum unified tree algorithm.

16. The computer program product of claim 15, wherein the minimum unified tree algorithm comprises:

identifying all descendent nodes of a set of subtrees, wherein the set of subtrees comprises the set of identical lineages;

identifying subtrees in the set of subtrees that comprise a most similar set of descendents, wherein the most similar set of descendent nodes comprise a most number of same descendent nodes; and merging the subtrees in the set of subtrees that comprise the most similar set of descendent nodes.

17. The computer program product of claim 13, wherein the identifier comprises a 4-tuple label, and wherein the 4-tuple label comprises a label element, a left element, a fight element, and a depth position element.

18. The computer program product of claim 17, wherein the left element comprises a traversal number when entering a node, and wherein the fight element comprises the traversal number when exiting the node.

19. The apparatus of claim 8, wherein the step of serializing the unified tree to form a set of sequential series that represents the set of data structure trees comprises:

splitting the unified tree back into each data structure tree in the set of data structure trees that existed prior to merging the set of data structure trees;

flattening the set of data structure trees into a set of sequential series that comprises the identifier for each node in a corresponding data structure tree; and listing the identifier for the each node in the corresponding data structure tree to form the index for the set of data to be indexed.

* * * * *